United States Patent
Rigollet et al.

(12)

(10) Patent No.: US 11,112,042 B2
(45) Date of Patent: Sep. 7, 2021

(54) TIGHTENING DEVICE COMPRISING A BELT AND TWO TIGHTENING LUGS ADDED THEREON

(71) Applicant: CAILLAU, Issy les Moulineaux (FR)

(72) Inventors: Nicolas Rigollet, Romorantin-Lanthenay (FR); Dylan Clerc, Romorantin-Lanthenay (FR)

(73) Assignee: Caillau, Issy les Moulineaux (FR)

( * ) Notice: Subject to any disclaimer, the term of this patent is extended or adjusted under 35 U.S.C. 154(b) by 0 days.

(21) Appl. No.: 16/715,354

(22) Filed: Dec. 16, 2019

(65) Prior Publication Data
US 2020/0191308 A1 Jun. 18, 2020

(30) Foreign Application Priority Data
Dec. 17, 2018 (FR) ....................... 1873093

(51) Int. Cl.
*F16L 33/04* (2006.01)
*F16L 21/06* (2006.01)

(52) U.S. Cl.
CPC ............. *F16L 33/04* (2013.01); *F16L 21/065* (2013.01)

(58) Field of Classification Search
CPC .................. F16L 33/04; F16L 21/065
See application file for complete search history.

(56) References Cited

U.S. PATENT DOCUMENTS 2,934,805 A * 5/1960 Zartler ................. F16L 33/04
 24/279
9,556,982 B2 * 1/2017 Prevot .................. F16L 21/065

FOREIGN PATENT DOCUMENTS

| EP | 2 594 835 A1 | 5/2013 |
| EP | 2 789 888 A1 | 10/2014 |
| FR | 84 691 E | 3/1965 |
| KR | 2008 0003496 U | 8/2008 |

OTHER PUBLICATIONS

French Search Report (2 pages) dated Jul. 22, 2019 for FR Application No. 1873093.

* cited by examiner

*Primary Examiner* — Robert Sandy
(74) *Attorney, Agent, or Firm* — Fay Sharpe LLP

(57) ABSTRACT

The tightening device includes a belt (10) having a first and a second end (10A, 10B) and a first and a second tightening lug (14A, 14B) carried by the belt which are formed respectively in a first and a second band portion (12A, 12B) respectively fastened to the outer face of the belt (10) in the vicinity of its first and its second end (10A, 10B). At least the first band portion (12A) is fastened to the belt (10) through at least a first fastening area (18A) formed on a boss (18'A) of the first band portion (12A) protruding inwardly and/or a boss of the belt protruding outwardly.

16 Claims, 7 Drawing Sheets

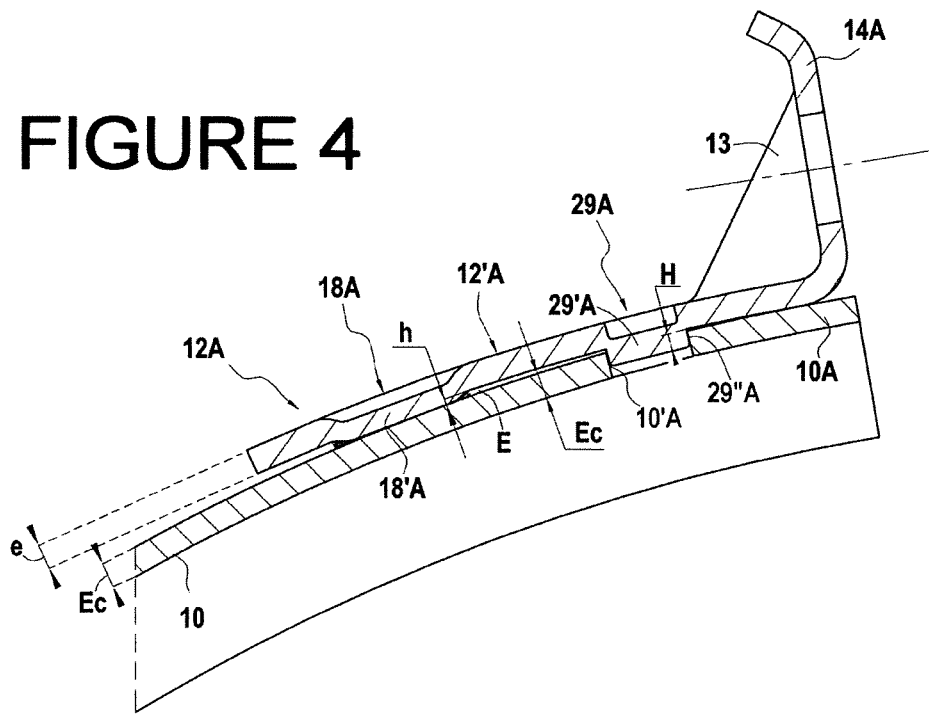

TIGHTENING DEVICE COMPRISING A BELT AND TWO TIGHTENING LUGS ADDED THEREON

This application claims priority from French Patent Application No. 1873093, filed on Dec. 17, 2018, and is incorporated herein by reference in its entirety.

TECHNICAL FIELD

The present disclosure relates to a tightening device of the hose clamp type, comprising a belt with a first and a second end, and a first and a second tightening lug carried by the belt, which are formed respectively in a first and a second band portion respectively fastened to the outer face of the belt in the vicinity of its first and second end.

PRIOR ART

Tightening devices of this type are known, for example from US patent application 2003/0015872. Conventionally, the band portions in which the lugs are formed present a curvature adapted to that of the belt and are pressed against the outer face of this belt to be fastened to the latter at several fastening points, for example by welding.

These known devices present several drawbacks. On the one hand, it is necessary to have, for each belt diameter, band portions adapted to this diameter, that is to say presenting curvatures corresponding to those of the belt. This complicates the manufacture and the supply to be able to propose a range of devices of different diameters. In addition, when the belt is tightened on an object, the diameter of this belt is reduced, so that its curvature must be able to increase uniformly (that is to say, its radius of curvature decreases) in order to properly tighten the object around its entire perimeter. However, the first and second band portions pressed on the belt can affect this uniformity by locally stiffening the belt.

DISCLOSURE OF THE INVENTION

The disclosure aims at overcoming at least substantially the aforementioned drawbacks.

Thus, the disclosure relates to a tightening device comprising a belt having a first and a second end, and a first and a second tightening lug carried by the belt which are formed respectively in a first and a second band portion respectively fastened to the outer face of the belt in the vicinity of its first and its second end, at least the first band portion being fastened to the belt through at least a first fastening area formed on a boss of the first band portion protruding inwardly and/or a boss of the belt protruding outwardly and through a second fastening area, in which, around the boss on which the first fastening area is formed, a clearance gap is arranged between the inner face of the first band portion and the outer face of the belt.

Thus, with the device according to the disclosure, the boss on which the fastening area is formed can form a kind of tilting point between the concerned band portion and the belt. In other words, when it is desired to fasten the band portion on the belt, the boss is placed at the appropriate location on the outer face of the belt, and a fastening in this first fastening area is made. It is therefore not necessary to have a continuous contact between the inner face of the band portion and the outer face of the belt. Particularly, the clearance gap arranged between the inner face of the first band portion and the outer face of the belt allows slight displacements between the first band portion and the belt, which allows using the same first band portion for belts of different diameters.

To produce the second fastening area, it is sufficient to tilt the band portion relative to the belt while maintaining contact between the boss and the outer face of the belt until another area of the band portion comes into contact with the belt, so as to make a second fastening in this second contact area.

It is understood that it is thus possible to use the same range of lugged band portions, for belts of different diameters. In addition, in so far as the first fastening area is made on the boss, the deformations of the band portion and of the belt may be to some extent decorrelated during tightening so that the fastening of the band portion does not interfere with the uniform reduction of the diameter of the belt.

Optionally, the first fastening area is formed by welding.

Optionally, the first and second fastening areas are aligned in the circumferential direction of the belt.

Optionally, the dimension of the second fastening area, measured according to the surface of the belt, is similar to that of the first fastening area.

Optionally, the dimension of the first fastening area represents between 15 mm$^2$ and 80 mm$^2$, preferably between 25 mm$^2$ and 60 mm$^2$.

Optionally, the first fastening area represents a substantially disk-shaped surface having a diameter of between 25% and 60% of the width of the belt.

Optionally, the first and second fastening areas are aligned in the circumferential direction of the belt.

Optionally, the second fastening area is formed on a boss of the first band portion protruding inwardly and/or a boss of the belt protruding outwardly.

Optionally, the boss of the second fastening area is formed in one of the elements comprising the first band portion and the belt, and delimits a wedging rim, and the other of the elements comprising the first band portion and the belt has an opening in which the boss of the second fastening area is accommodated and wedged.

Optionally, the second fastening area is formed by clinching.

Optionally, the second fastening area is formed by welding.

Optionally, of the first and second fastening areas, only the first fastening area is formed by welding, this first fastening area being optionally behind the second fastening area.

Optionally, the first and second band portions are fastened to the belt in the same manner.

Optionally, exactly two fastening areas are provided for each of the first and second band portions.

The first fastening area constitutes a more or less point fastening of small dimensions. The same applies when this point fastening is present for the second fastening area. The second fastening area may also be formed on a boss so as to further increase the decorrelation between the deformations of the band portion and those of the belt. It is possible to choose between making the fastening in the two fastening areas by welding or, for either or both of the first and second fastening areas, making another fastening, for example by clinching with retaining deformation, or by wedging.

The present disclosure will be well understood and its advantages will become more apparent upon reading the following detailed description of embodiments represented by way of examples in the accompanying figures.

BRIEF DESCRIPTION OF THE APPENDED DRAWINGS

FIG. 4 is a sectional view in the plane IV-IV of FIG. 3.

FIG. 5 shows, in a view corresponding to that of FIG. 4, also another embodiment.

DESCRIPTION OF THE EMBODIMENTS

Figure 1:
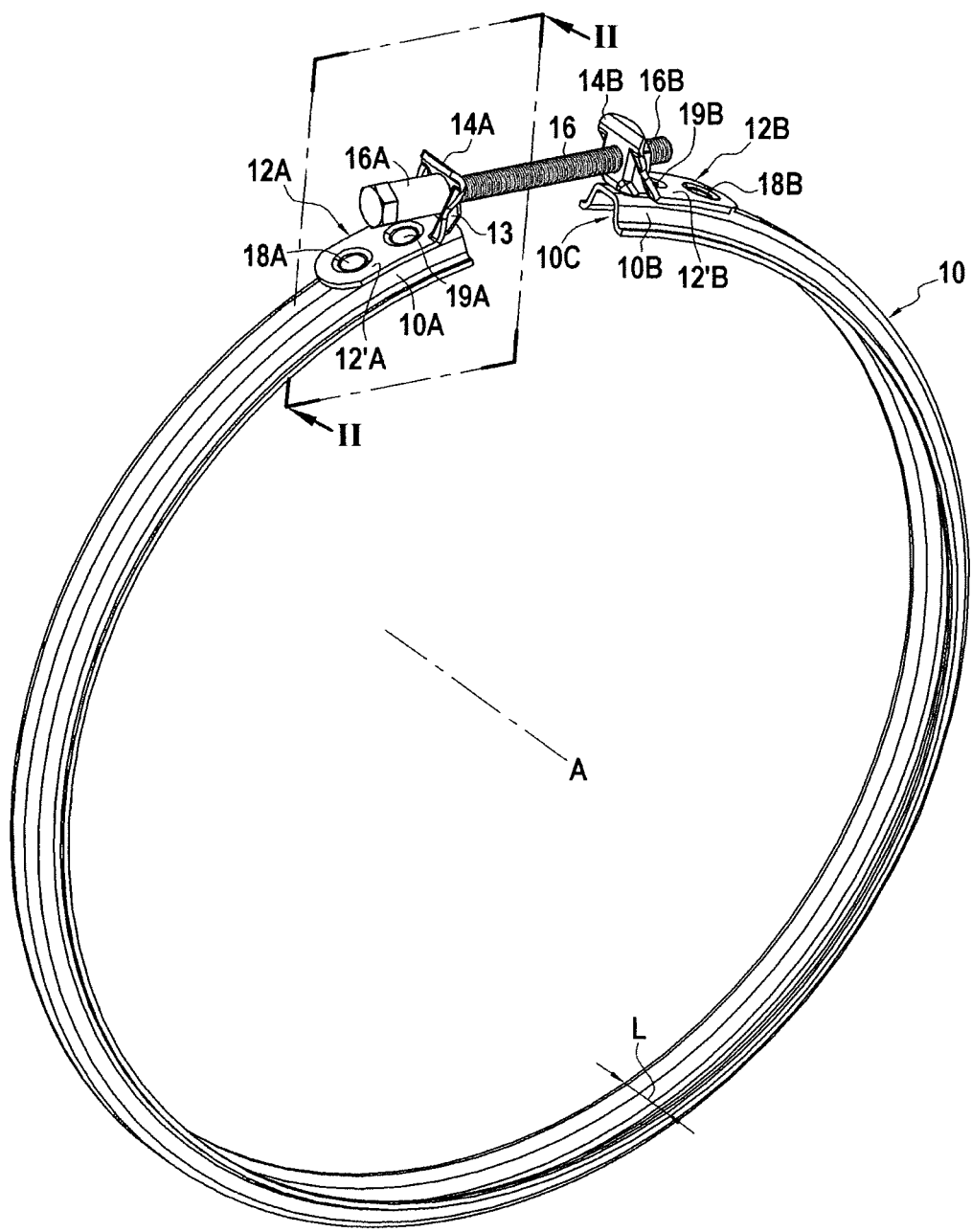
FIG. 1 is a perspective view of a tightening device according to the present disclosure, according to a first embodiment.

FIG. 1 shows a tightening device comprising a belt 10 that has a first and a second end respectively 10A and 10B. This belt is composed of a metal band wound on itself about an axis A. In this instance, the belt is profiled insofar as it presents, in a cross-section parallel to the axis A, a section which delimits an internal recess 10C. For example, the belt is used for the fastening of two ends of tubes each having a bearing surface, so that when the tubes are connected, these surfaces are accommodated in the aforementioned internal recess 10C. For example, this recess may have a U or V shape.

The device comprises a first and a second band portion respectively 12A and 12B which are fastened to the outer face of the belt 10 respectively in the vicinity of its first and its second end 10A and 10B.

Conventionally, within the meaning of the present disclosure, the outer face of one element is the one that is furthest from the axis A. Thus, the recess 10C aforementioned is formed on the inner face of the belt. In addition, the forward and backward directions extend relative to the direction of movement of the ends of the clamp during tightening. Thus, during tightening, the end 10A of the clamp tends to move toward the end 10B, that is to say forwards. In other words, when it comes to the end 10A or to an element carried by the end 10A, the forward direction is the one that is toward the end 10B. Similarly, when it comes to the end 10B or to an element carried by the end 10B, the forward direction is the one that is toward the end 10A.

Respective tightening lugs 14A and 14B are formed in the band portions 12A and 12B. These lugs are substantially radially straightened so that they can be manipulated to be moved relative to each other so as to decrease the diameter of the belt 10, by thus tightening the device on an object to be tightened, for example the ends of connected tubes.

In this instance, each lug 14A, 14B is formed integrally with the band portion 12A, 12B that carries it. The lugs can be formed by a simple folding or, as in the example represented, by straightened and stamped portions, so that each lug has side cheeks 13 that contribute to ensure its stiffness.

In this instance, the tightening lugs cooperate with a tightening rod 16 which can be manipulated to move them relative to each other so as to perform the tightening. In this instance, this rod is a screw, having a head or a nut 16A retained behind one of the lugs 14A and 14B, and with which a nut 16B retained behind the other lug cooperates. The lugs 14A and 14B have bores through which the shaft of the screw 16 passes.

Each of the band portions 12A and 12B comprises a flange 12'A, 12'B generally parallel to the belt 10 and fastened thereto, as well as a straightened portion formed by the lug, respectively 14A and 14B. Here, "generally parallel" means extending generally in the same direction as the belt, without necessarily presenting the same curvature as the latter. The band portions 12A and 12B are fastened to the outer face of the belt by their respective flanges 12'A, 12'B.

Figure 2:
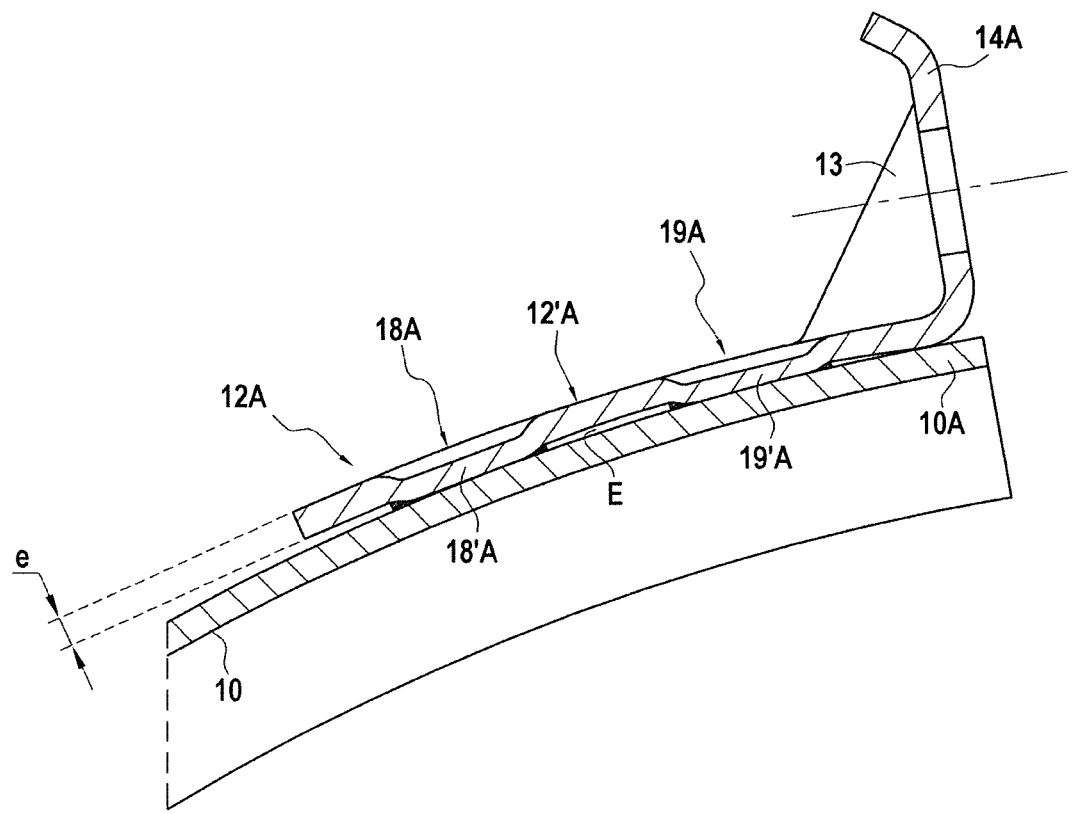
FIG. 2 is a sectional view in the plane II-II of FIG. 1.

In FIG. 2, the fastening of the band portion 12A to the belt 10 can be better seen. This fastening comprises a first fastening area 18A and a second fastening area 19A disposed one after the other in the circumferential direction of the belt 10. In this instance, these fastening areas 18A and 19A are aligned in the circumferential direction of the belt. FIG. 1 shows, likewise, that the second band portion 12B is fastened to the belt at a first and a second fastening area, respectively 18B, 19B.

In this instance, the fastenings of the first and second band portions to the belt are identical. It can be seen that the first fastening area 18A is formed on a boss 18'A of the first band portion 12A protruding inwardly, that is to say, toward the axis A. In the first fastening area 18A, it is through the contact surfaces between the boss 18'A and the outer face of the belt 10 that the fastening takes place, and it can be seen that, on either side of this boss, the inner face of the band portion 12A is at a slight distance from the outer face of the belt. The clearance gap E thus arranged allows slight displacements between the first band portion 12A and the belt 10, which makes it possible to use the same first band portion for belts of different diameters. The same applies to the first fastening area 18B of the band portion 12B. Thus, the flanges 12'A and 12'B, while being generally parallel to the belt, that is to say oriented like the latter, may have a different curvature from that of the belt.

In this instance, the first fastening area 18A can be formed by a fastening by welding.

In this instance, the second fastening area 19A is similar to the first fastening area 18A. Thus, it presents a boss 19'A arranging a gap between the adjacent surfaces of the belt and of the first band portion, and is made by welding. In this instance, the dimensions of the first fastening areas 18A, 18B and of the second fastening areas 19A, 19B are similar. This means that the surfaces occupied by the welds of these fastening areas are the same while being able to slightly vary relative to each other, for example according to a variation margin of the order of 30% or less, or even 10% or less.

In the embodiment just described, the first and second fastening areas are formed by welding, the second area being here formed on a boss, as the first area. However, while maintaining the adaptability at different diameters, it could be possible to form the second area in undeformed areas of the band portion and of the belt (that is to say on areas devoid of bosses).

Figure 3:
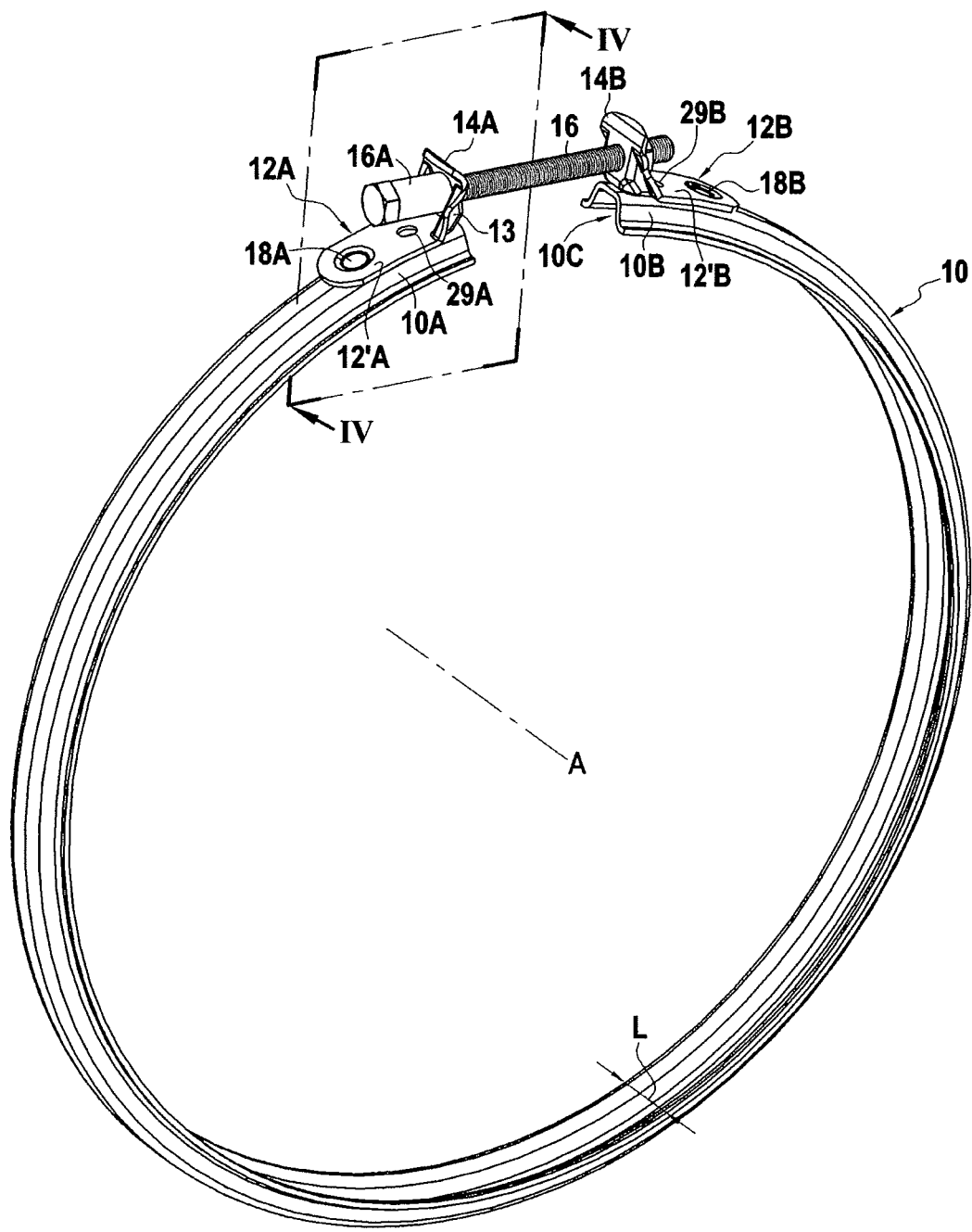
FIG. 3 is a view similar to FIG. 1, for another embodiment.

A second embodiment will now be described with reference to FIGS. 3 and 4. In these figures, the elements that are unchanged compared to FIGS. 1 and 2 are designated by the same references.

In this second embodiment, the first fastening areas 18A and 18B are identical to those of the first embodiment.

However, the second fastening areas 29A and 29B are different here. The second fastening area 29A is described, the second fastening area 29B being identical thereto. This second fastening area 29A comprises a boss 29'A which has the shape of a stud delimiting a wedging rim 29"A. Particularly, this wedging rim 29"A has the shape of a cylindrical surface portion whose axis is oriented along a radius of the belt 10. The belt 10 for its part has an opening 10'A in which the boss 29'A is accommodated. This opening has for example the shape of a circular hole whose axis is the same as that of the cylindrical surface formed by the wedging rim 29"A. It is understood that the edge of this opening also forms a wedging edge for the wedging rim 29"A, the diameter of the opening being equal to or slightly greater than that of the wedging rim 29"A. The height H of the wedging rim 29" A corresponds at most substantially to the thickness Ec of the belt 10, that is to say to the height of the edge of the opening 10'A. For example, the height H is of the order of 50% to 80% of the thickness Ec. Thus, the boss 29'A is actually accommodated in this opening without protruding on the inner face of the belt 10.

Of course, the fact that the wedging rim 29"A and the edge of the opening 10'A form cylindrical surfaces with circular base is only one exemplary embodiment. What is important is that these surfaces are adapted to each other and are generally oriented at the same radius of the belt.

For example, to fasten the band portion 12A to the belt 10, the boss 29'A is first inserted into the opening 10'A thus forming the second fastening area 29A, and the boss 18'A is welded to the outer face of the belt thus forming the first fastening area 18A. It is noted that, in this operation, the flange 12'A of the band portion 12A can be tilted so as to be adapted to the belt 10, without the curvature of this flange having necessarily been originally adapted to that of the belt. The boss 29'A is thus used as a marker to correctly position the band portion 12A on the belt and produce the first fastening area. In the free state, before tightening the belt, it is possible that the boss 29'A tends to slightly leave the opening 10'A. However, as the tightening continues, the cooperation between the wedging rim 29"A of the boss 29'A and the wedging edge of the opening 10'A is implemented naturally since, under the effect of the tightening force, the flange 12'A of the band portion 12A is pressed against the outer face of the belt.

FIG. 5 which shows another embodiment is now described. In this figure, the same references are also kept for the unchanged elements. This embodiment also differs from the previous ones by the shaping of the second fastening area 39A. In this instance, this second fastening area is produced by clinching 39"A, which means that in this area, the flange 12'A of the band portion 12A and the belt 10 are pressed against each other and are deformed together by a non-through joint stamp. In this instance, this deformation is made toward the inside of the belt. In the second fastening area, the materials of the flange 12'A and of the belt are in close mechanical cooperation, so that the band portion 12A is perfectly wedged relative to the belt. As in the previous embodiment, in order to fasten the band portion 12A to the belt, it is possible to first produce the second fastening area 39A, then to weld the boss 18'A on the outer face of the belt 10 as to produce the first fastening area 18A. Of course, the second band portion 12B can be fastened in the same manner as the first band portion 12A.

Figure 6:
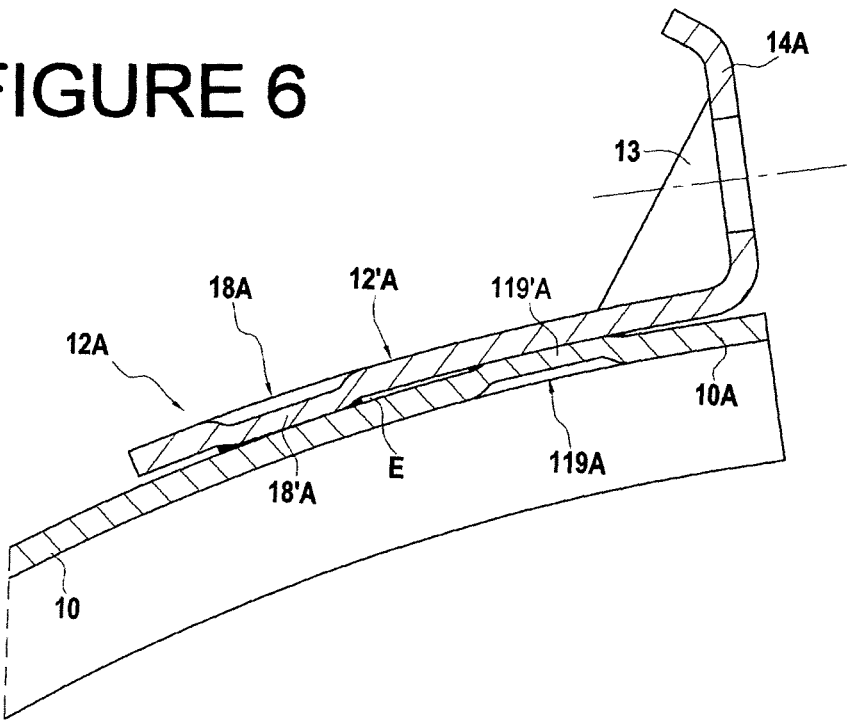
FIG. 6 shows, in a view corresponding to that of FIG. 4, also another embodiment.

As indicated, to create a gap between the flange of the band portion and the belt, the boss 18'A in which the first fastening area is formed protrudes inwardly when it is made on the band portion 12A. It is thus possible to produce the first fastening area, while producing the second fastening area by an outward deformation from the inner face of the belt. This is shown in FIG. 6, in which the boss 18'A of the first fastening area 18A is recognized. On the other hand, in this figure, the second fastening area 119A, which in this instance is also formed by welding, is produced on a boss 119'A of the belt protruding outwardly. Thus, this boss cooperates with the inner face of the flange 12'A of the band portion 12A in a contact area in which this flange may be flat.

Figure 7:
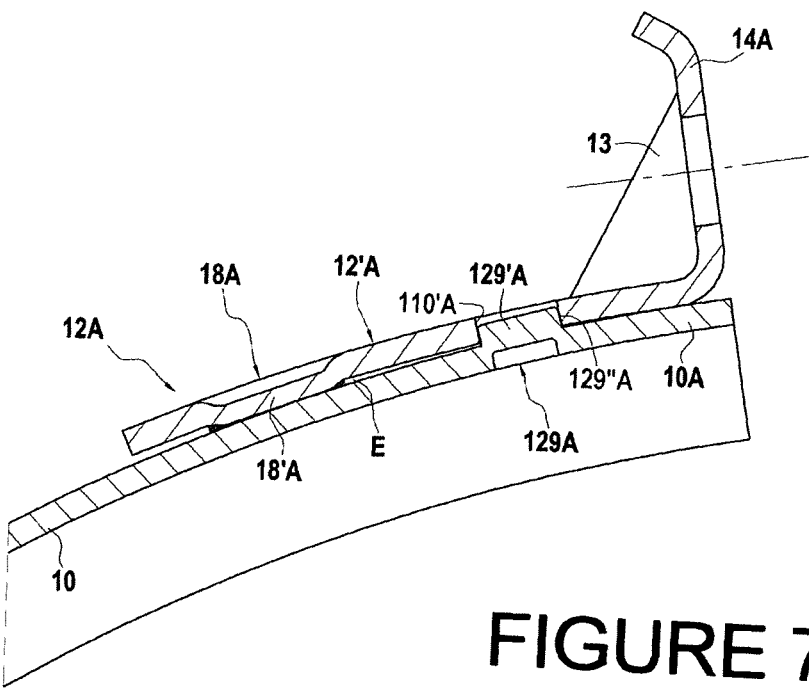
FIG. 7 shows, in a view corresponding to that of FIG. 4, also another embodiment.

Similarly, FIG. 7 shows one variant of the embodiment of FIG. 4, in which the first fastening area 18A is still unchanged, but the second fastening area 129A comprises a boss 129'A formed in the belt 10 and protruding outwardly. For its part, the flange 12'A of the band portion 12A has an opening 110'A which delimits a wedging edge for the wedging rim 129"A formed by the side surface of the boss 129'A. This boss may have the shape of a stud and the wedging rim may be a surface substantially parallel to a radius of the belt.

Figure 8:
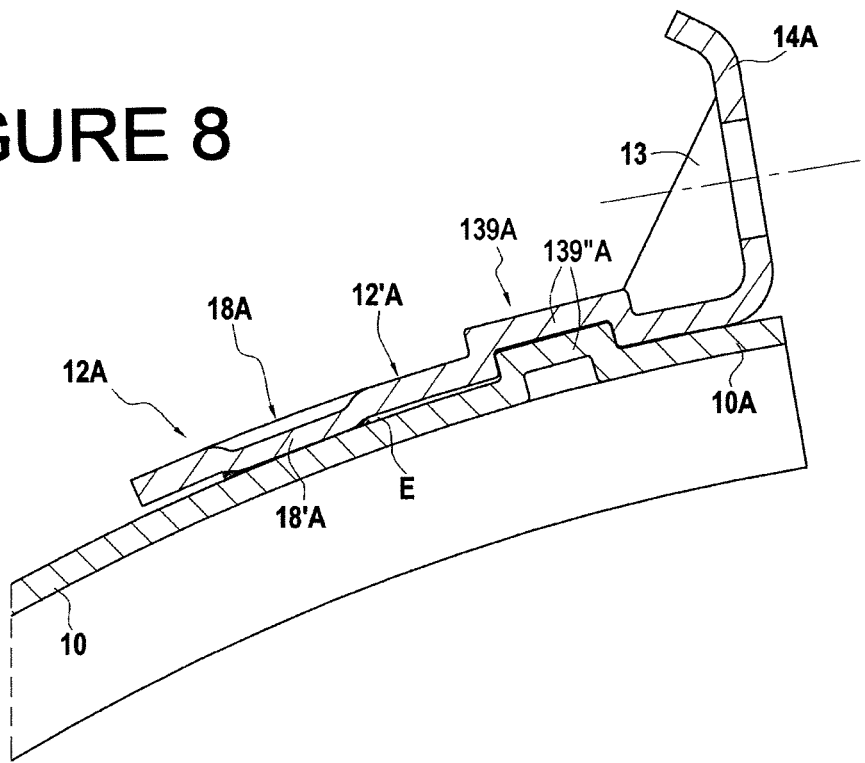
FIG. 8 is a view similar to that of FIG. 4, showing one variant.

FIG. 8 shows one variant of the embodiment of FIG. 5, in which the first fastening area 18A is also unchanged, while the second fastening surface 139A is produced by a clinching 139"A outwardly: the joint deformations of the belt 10 and of the flange 12'A of the portion of the band 12A are made outwardly. Thus, the second fastening area does not protrude on the inner face of the belt 10.

Figure 9:
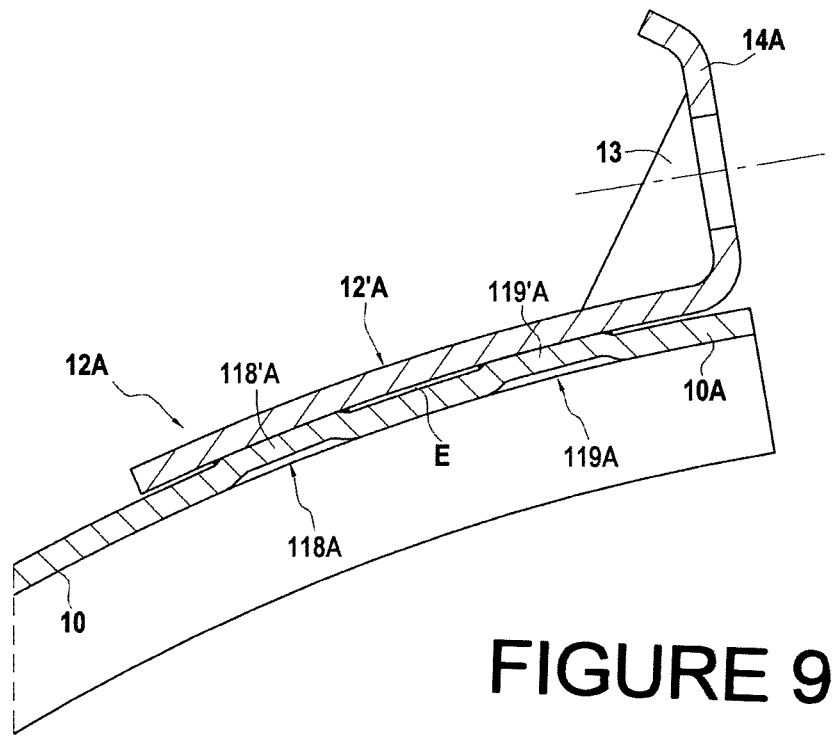
FIG. 9 is a view similar to that of FIG. 4, showing one variant.

FIG. 9 is now described, showing one variant of the first embodiment in which the first fastening area 118A this time comprises a boss 118A which is a boss of the belt 10 protruding outwardly. This boss cooperates with the inner face of the flange 12'A of the band portion 12A, which may be flat, and thus arranges a clearance gap E between the faces opposite this flange 12'A and the belt 10. In this instance, the second fastening area 119A is shown as in FIG. 6. Of course, this second fastening area could have any one of the configurations described with reference to the preceding figures.

Figure 10:
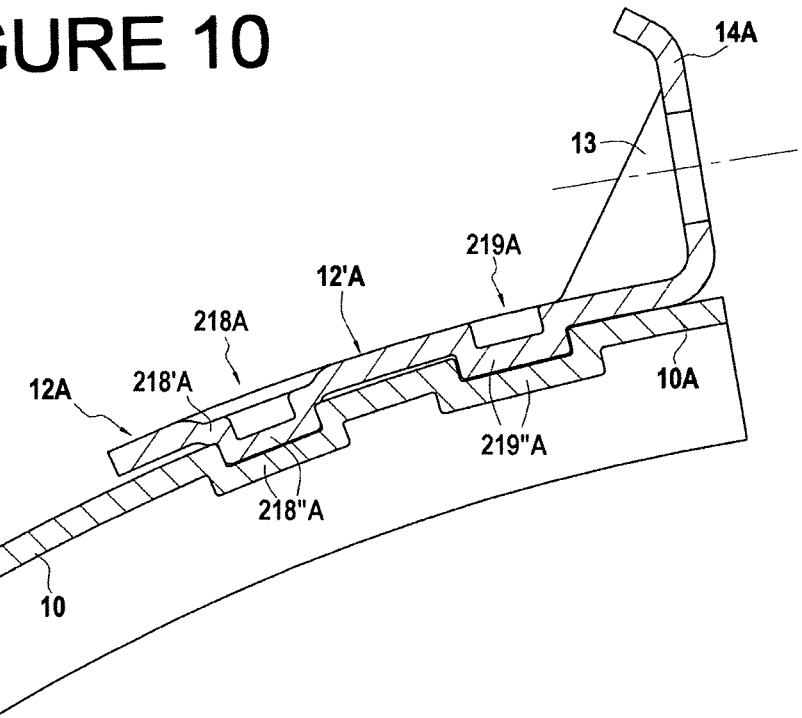
FIG. 10 is a view similar to that of FIG. 4, showing one variant.
Figure 11:
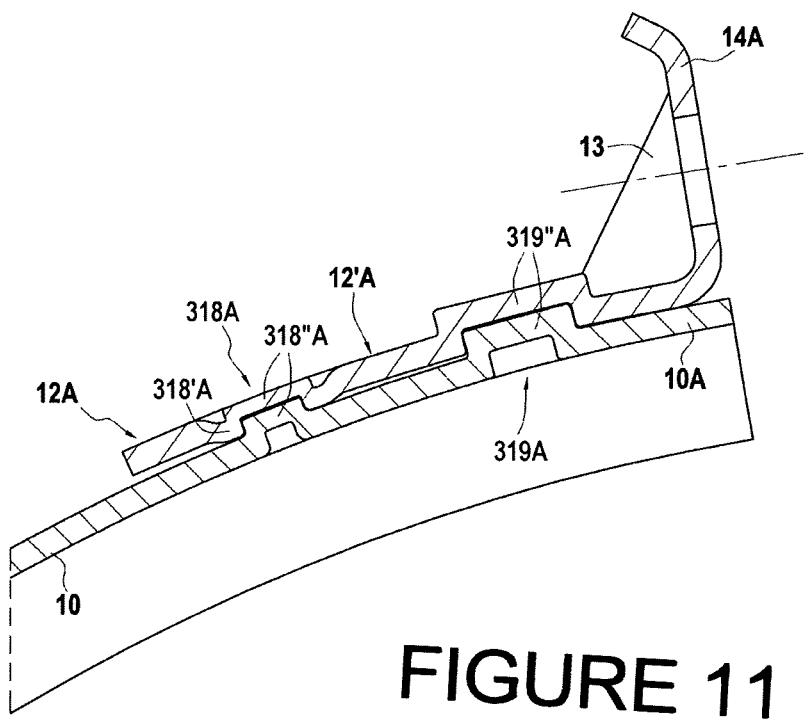
FIG. 11 is a view similar to that of FIG. 4, showing one variant.

FIG. 10 shows another variant of the first embodiment in which the first fastening area 218A is formed by clinching 218"A, in this instance, a clinching protruding inwardly. Indeed, the bottom of the boss 218'A which is, in this instance, formed in the band portion 12A, is deformed inwardly with an adjacent part of the belt 10. Thus, in this case, the first fastening area does not require a welding. It is of course possible to form the boss in the belt, as in FIG. 9. Moreover, as shown in FIG. 11, it is possible to form the boss in one direction and the clinching in the other direction. Thus, in FIG. 11, the first fastening area 318A comprises a boss 318'A of the band portion 12A, this boss protruding inwardly, and a clinching 318"A formed by an outward joint deformation of the material of the bottom of the boss and of the material of the adjacent part of the belt.

In FIGS. 10 and 11, the first fastening area does not require a welding. In this instance, the same applies to the second fastening area. By way of example, FIG. 10 shows the second fastening area 219A formed by a clinching 219"A inwardly, and FIG. 11 shows the second fastening area 319A formed by a clinching 319"A outwardly.

It is further noted that, in the examples of FIGS. 10 and 11, the second fastening area is formed without boss. Indeed, as long as the gap between the inner face of the band portion 12A and the outer face of the belt 10 is provided in the region of the first fastening area by the boss of this area, the second fastening area may not include a boss if this gap is considered sufficient for the adaptation of the band portion to the curvature of the belt. This of course applies when the fastening areas are formed by welding.

The first fastening area has advantageously small dimensions, it can thus represent a surface of the order of 15 mm² to 80 mm², preferably of the order of 25 mm² to 60 mm². This surface is understood as the contact surface contributing to the fastening of the belt portion 12A to the belt in the first fastening area. This surface may correspond to that of a disc having a diameter of between 25 and 60% of the width L of the belt. When it comes to a profiled belt, this width L is understood as the length, measured parallel to the axis A of the belt, between the two edges of the latter. However, the belt can obviously take other shapes, and for example that of a flat band, in which case this edge-to-edge width would be that of this flat band.

As seen, and particularly when it is produced by a stud-shaped boss wedged in an opening of the belt or by clinching, the second fastening area can first be implemented to be used to position the band portion relative to the belt and then produce the first fastening area, for example by welding.

The height h of the boss 18'A can generally be of the same order as the thickness e of the band portion 12A (FIG. 4). Generally, this height can be between about 10% and 100% of this thickness e. When the fastening in the first fastening area is made by welding, the weld tends to flatten the boss, so that the remaining height of the boss which corresponds to the height of the gap E in an area immediately adjacent to the first fastening area can be reduced and for example be of the order of 5 to 20% of the thickness e. For example, the band portions 12A and 12B and the belt are made of metal bands having the same thickness or substantially the same thickness.

In the embodiments represented, exactly two fastening areas are provided for each of the first and second band portions. On the one hand, this small number of fastening areas allows the adaptation of each band portion to the curvature of the belt without the curvature of each band portion being necessarily initially the same as that of the belt. On the other hand, the fact of having two fastening areas rather than only one for each band portion makes it possible to align the band portions with the circumferential direction of the belt and to avoid the risks of angular offset by the deviation along the direction of the axis A.

The invention claimed is:

1. A tightening device comprising a belt having a first and a second end, and a first and a second tightening lug carried by the belt which are formed respectively in a first and a second band portion respectively fastened to an outer face of the belt in the vicinity of the first and the second end, at least the first band portion being fastened to the belt through at least a first fastening area formed on at least one of a boss of the first band portion protruding inwardly and a boss of the belt protruding outwardly, and through a second fastening area; wherein, around the boss on which the first fastening area is formed, a clearance gap is arranged between the inner face of the first band portion and the outer face of the belt.

2. The device according to claim 1, wherein the first fastening area is formed by welding.

3. The device according to claim 1, wherein the first and second fastening areas are aligned in the circumferential direction of the belt.

4. The device according to claim 1, wherein a dimension of the second fastening area measured according to the surface of the belt, is similar to a dimension of the first fastening area.

5. The device according to claim 1, wherein a dimension of the first fastening area represents an area between 15 mm² and 80 mm².

6. The device according to claim 1, wherein a dimension of the first fastening area represents an area between 25 mm² and 60 mm².

7. The device according to claim 1, wherein the first fastening area represents a substantially disk-shaped surface having a diameter of between 25% and 60% of the width of the belt.

8. The device according to claim 7, wherein the boss of the second fastening area is formed in one of the first band portion and the belt and delimits a wedging rim, and wherein another one of the first band portion and the belt has an opening in which the boss of the second fastening area is accommodated and wedged.

9. The device according to claim 7, wherein the first and second fastening areas are aligned in the circumferential direction of the belt.

10. The device according to claim 1, wherein the second fastening area is formed on at least one of a boss of the first band portion protruding inwardly and a boss of the belt protruding outwardly.

11. The device according to claim 1, wherein the second fastening area is formed by clinching.

12. The device according to claim 1, wherein the second fastening area is formed by welding.

13. The device according to claim 12, wherein the first fastening area is behind the second fastening area.

14. The device according to claim 1, wherein, of the first and second fastening areas, only the first fastening area is formed by welding.

15. The device according to claim 1, wherein the first and second band portions are fastened to the belt in the same manner.

16. The device according to claim 1, wherein exactly two fastening areas are provided for each of the first and second band portions.

* * * * *